US007734566B2

(12) United States Patent
Caracas et al.

(10) Patent No.: US 7,734,566 B2
(45) Date of Patent: Jun. 8, 2010

(54) INFORMATION RETRIEVAL METHOD WITH EFFICIENT SIMILARITY SEARCH CAPABILITY

(75) Inventors: Alexandru M. Caracas, Bruchsal (DE); Tobias Niekamp, St. Ilgen (DE); Sascha H. Schmitt, Mannheim (DE)

(73) Assignee: SAP AG, Walldorf (DE)

( * ) Notice: Subject to any disclaimer, the term of this patent is extended or adjusted under 35 U.S.C. 154(b) by 87 days.

(21) Appl. No.: 10/980,117

(22) Filed: Nov. 1, 2004

(65) Prior Publication Data

US 2006/0106762 A1 May 18, 2006

(51) Int. Cl.
  *G06F 17/30* (2006.01)
(52) U.S. Cl. .................. 707/3; 707/4; 707/5; 707/6; 707/7; 707/101
(58) Field of Classification Search .................. 707/6, 707/101, 7
  See application file for complete search history.

(56) References Cited

U.S. PATENT DOCUMENTS 6,633,882 B1 * 10/2003 Fayyad et al. ............... 707/101

2004/0002973 A1 * 1/2004 Chaudhuri et al. .......... 707/7

OTHER PUBLICATIONS

Schumacher et al., "An Efficient Approach to Similarity-Based Retrieval on Top of Relational Databases", 2000, University of Kiaserslautern, Germany.
Aamodt et al., "Case-Based Reasoning: Foundational Issues, Methodological Variations, and System Approaches", AI Communications, 1994, vol. 7.
Ralph Bergmann, "Experience Management: Foundations, Development Methodology, and Internet-Based Applications", 2002, pp. 93-139, Springer, Germany.

* cited by examiner

*Primary Examiner*—Tony Mahmoudi
*Assistant Examiner*—Michele C Choi
(74) *Attorney, Agent, or Firm*—Fountainhead Law Group PC

(57) ABSTRACT

Embodiments of the present invention include methods for retrieving information from an information base. In one embodiment, the present invention includes specifying a first query including one or more specified attribute values corresponding to one or more attributes, performing a count-only query on a structured information base for information elements having one or more attribute values within a first range, the first range including the specified attribute values, and performing a retrieval query for information elements having one or more attribute values within a second range, wherein the second range includes the first range.

25 Claims, 12 Drawing Sheets

1200 input: query containing attribute value pairs, number of desired results K and weights.

output: ranked list of documents with their respective global similarity value σ ordered decreasingly by σ.

Initialize τ;

While *not done* do
    Compute minimal local similarities $(m_1,...,m_M)$ for τ;
    Find biggest possible M-cuboid C that fits above the M-plane given by τ;
    Construct count-only orthogonal range query $Q_C$ corresponding to C;
    $k \leftarrow$ result of query $Q_C$;
    If $k \geq K$ then
        done true;
    end
    If $k < K$ then
        lower τ;
    end
end

Construct range query Q corresponding to minimal local similarities $(m_1,...,m_M)$;

Execute Q to retrieve the candidate documents;

Calculate their global similarity σ and use a priority queue of size K to keep them ordered;

Fig. 12

INFORMATION RETRIEVAL METHOD WITH EFFICIENT SIMILARITY SEARCH CAPABILITY

BACKGROUND

The present invention relates to information retrieval, and in particular, to a method of retrieving information with similarity search capability.

The explosive growth and prevalence of computer technologies, data storage capacities and the Internet have led to an ever-increasing amount of information being stored in electronic form. As the amount of available electronic information grows, individuals and organizations have sought to put this information to a productive use. For example, many companies with large information bases may seek to use electronic information to improve the way the business is managed. The information stored in a companies data storage facilities may represent years of the companies experiences in a business environment, and such information may be useful in helping to solve new problems that the business faces as such problems arise. Furthermore, a company's information base may include historical or real-time data about the company's financial performance, research and development activities, or manufacturing activities to name just a few. A variety of systems exist for managing such information, but such systems must first be able to access useful information in a way that is meaningful.

While the availability of large volumes of information creates the potential for improved problem solving and decision-making, it is difficult to find and retrieve specific information for a particular use from the large volumes of information available. Thus, the ever-increasing volumes of information, together with the desire to make use of the information, have created a need for methods of retrieving specific pieces of information from a large information base. Information retrieval methods also act as the inputs to information management systems. Without an effective and efficient method of retrieving useful information, such systems cannot be used to their full potential.

Information retrieval methods for structured information typically require a user to specify what information is desired. This is usually done by allowing a user to specify a search request (i.e., a query). Traditional information retrieval methods have focused on finding and retrieving data that is an exact match of a query (e.g., retrieve the account information for a person with the name "John"). However, many useful pieces of information may not be recovered if an exact match is required. Thus, the notion of "similarity" searching has been attracting more attention as a method of retrieving information.

In a similarity search, information may be retrieved even though it does not exactly match the information specified in the search request (i.e., the retrieved data is either the same as or "similar" to a search criterion). Similarity searches typically perform a search across a broader range of information than traditional searches, and return information that differs from the search request in a variety of different ways. For example, similarity searching typically includes numerous processing steps for determining whether or not data that is not an exact match is nevertheless "similar" enough to the search criteria to warrant retrieval. However, because similarity searching typically requires processing steps other than a direct comparison of the search criteria to the data, such searches can be extremely inefficient, computationally intensive and slow. Moreover, the accuracy of the results of a similarity search may depend heavily on the methods employed to determine whether or not data is "similar." If the processing steps used in the similarity determination are not accurate, the search results will be meaningless, and the search may return information that is essentially useless. Examples may include scenarios where the information returned is completely unrelated to the problem at hand, or where the search returns too few or far too many results.

Thus, there is a need for a method of retrieving data in a way that will improve the efficiency, speed and accuracy of information retrieval over existing techniques. The present invention solves these and other problems by providing an information retrieval method with efficient similarity search capability.

SUMMARY

Embodiments of the present invention include methods for retrieving information from an information base. In one embodiment, the present invention includes specifying a first query including one or more specified attribute values corresponding to one or more attributes, performing a count-only query on a structured information base for information elements having one or more attribute values within a first range, the first range including the specified attribute values, and performing a retrieval query for information elements having one or more attribute values within a second range, wherein the second range includes the first range.

In one embodiment, the count-only query returns a value equal to the number information elements having a global similarity to the first query greater than a threshold value.

In another embodiment, the threshold value is equal to a sum of weighted local similarity values.

In another embodiment, the present invention includes a similarity model including local similarity functions, and local similarity values may be obtained using inverse similarity functions.

In yet another embodiment, an initial threshold value is based on a probability of obtaining a minimum number (K) of information elements.

In another embodiment, the present invention includes specifying a first query including one or more specified attribute values corresponding to one or more attributes, generating a threshold value, generating a local similarity value for each of the one or more attributes based on the threshold value, generating a first range based on each local similarity value, the first range including the specified attribute values, performing a count-only query on a structured information base for information elements having one or more attribute values within the first range, and performing a retrieval query for information elements having one or more attribute values within a second range, wherein the second range includes the first range.

Additional embodiments will be evident from the following detailed description and accompanying drawings, which provide a better understanding of the nature and advantages of the present invention.

BRIEF DESCRIPTION OF THE DRAWINGS

FIG. 12 is example pseudo code for retrieving information according to one specific embodiment of the present invention.

DETAILED DESCRIPTION

Described herein are techniques for retrieving information including similarity search retrieval methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
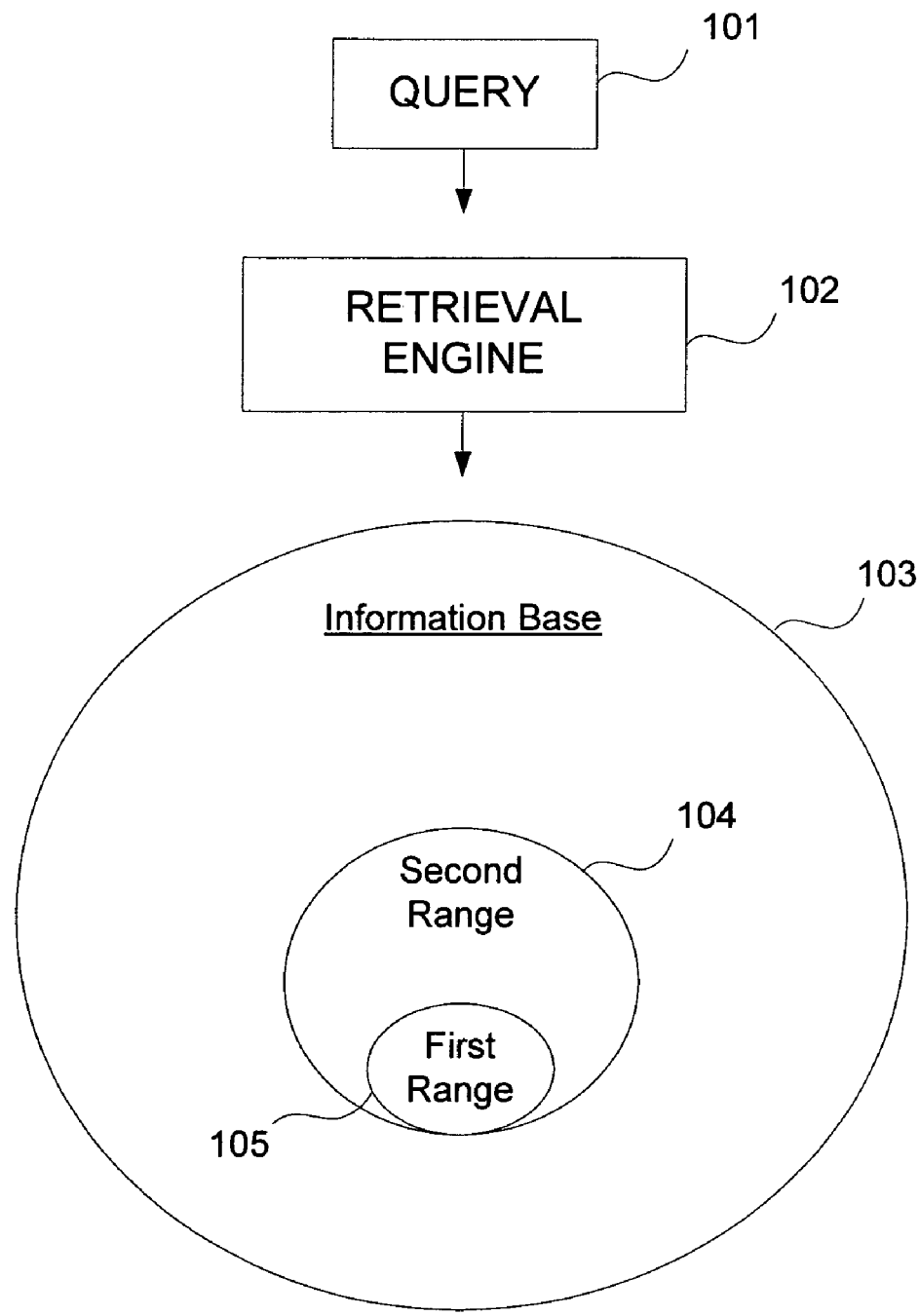
FIG. 1 illustrates a method of retrieving information elements from a structured information base according to one embodiment of the present invention.

Embodiments of the present invention include a method of retrieving information elements from a structured information base as illustrated in FIG. 1. Information base 103 represents the full scope of structured information available to the system. A structured information base 103 is a source of available structured information such as, for example, a database, collection of databases or an information repository. As a more specific example, a structured information base may be a physical digital record stored on disk or tape of a set of tables recording facts about certain business transactions such as sales or purchases, where each row in the table corresponds to a specific transaction and each column specifies such attributes of each transaction as date and time, location, responsible person or persons, product or products involved, monetary value of the transaction, and so on. However, it is to be understood that the present invention is general and may be applied on top of any database-like system. As used herein, structured information means that the information base is made up of identifiable elements (i.e., information elements) of data or metadata that each includes one or more attributes. As used herein, an attribute means an identifiable component of an information element having some specific associated meaning. For example, in a database table, the rows of the table would be information elements and the columns of a database table may be attributes of each row. More generally, an attribute may be a field within a record in the database. The rows of a database table are commonly referred to as "business objects" in some applications, and the columns of the table are the attributes of each business object. In object-oriented technology, each object may be an information element, and an attribute may be an element of data associated with the object. In XML, an attribute may be a sub-element defined within an element. Information elements may also be electronic documents in any of a variety of formats, including .pdf, .doc, .xls, or .ppt, for example. Attributes of electronic documents typically include data and metadata associated with the document, but not the main body of text in, for example, a .doc file. Attributes may take on values ("attributes values"), which may be any of a variety of different types. Thus, attribute values may be numbers (e.g., integers or floats), text characters or strings to name just a few. It is to be understood that the examples provided above are not exhaustive.

In one embodiment, the present invention includes a query 101 that is provided to a retrieval engine 102. Retrieval engine 102 performs a search across information base 103 for information elements that satisfy the parameters of query 101. A query is a retrieval request (e.g., a search request) that includes parameters that are used during the information retrieval process. A user may specify a query by specifying the parameters. For example, if a user wants to retrieve all records that were entered into a system on a particular date (e.g., Jun. 21, 1971), the user may specify such date as one of the query parameters. According to embodiments of the present invention, the system will then return all records having the same date or similar dates in response to receiving the query.

Attribute values may be specified in query 101 as retrieval parameters, and embodiments of the present invention will return information elements having attribute values that are the same as, or similar to, the specified attribute values. FIG. 1 illustrates that an information retrieval method according to one embodiment of the present invention may retrieve information elements that have attributes in different ranges. For example, retrieval engine 102 may initially search information base 103 for information elements having attribute values in a first range 105, and then search information base 103 for information elements having attribute values in a second range 104 that includes the first range 105. It is to be understood that if multiple attribute values are specified (e.g., M specified attributes), then the first and second ranges may be multidimensional (e.g., M-dimensional). Embodiments and advantages of this technique will be described in more detail below.

Figure 2:
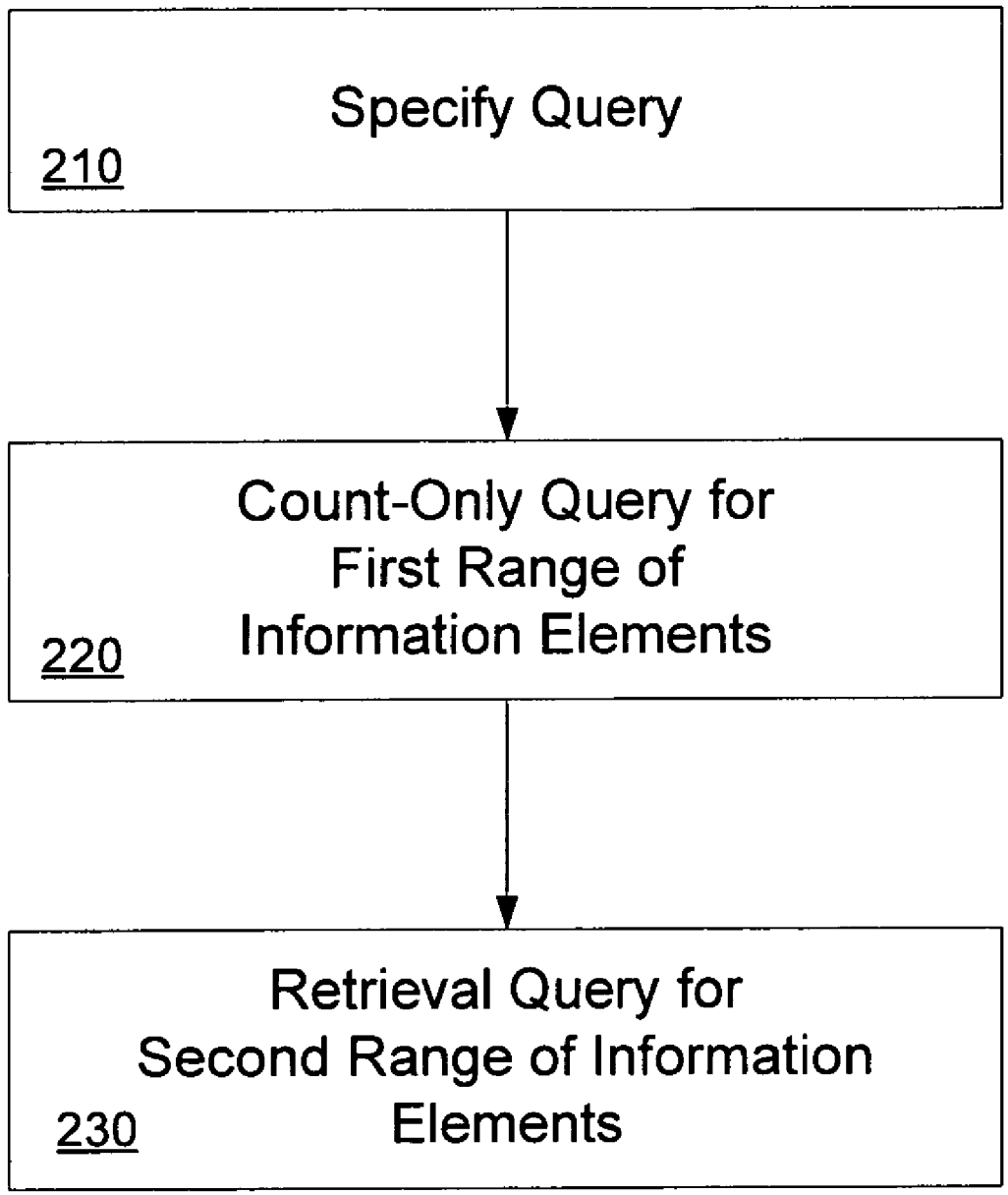
FIG. 2 illustrates a method of retrieving information according to one embodiment of the present invention.

FIG. 2 illustrates a method of retrieving information according to one embodiment of the present invention. At 210, a query is specified (e.g., by a user). The query may include one or more specified attribute values corresponding to one or more attributes of interest. For example, if the query is related to automobile prices, the query may include an attribute value of "5000" corresponding to a "Price" attribute (i.e., $5000) and an attribute value of "Red" corresponding to a "Color" attribute. At 220, the system performs a count-only query on a structured information base for information elements having one or more attribute values within a first range, where the first range includes the attribute values specified in the query. A count-only query is a query that returns a number (e.g., K) equal to the number of information elements that satisfy the query. The range of a query is the scope of attribute values, states, or contents responsive to a query. Using the example above for illustration, a count-only query may return a number equal to the number of database rows (e.g., automobile business objects) having a price within a range of prices including $5000 (e.g., $4000 to $6000). Furthermore, the count only query may return a number equal to the number of automobiles that have colors within a color range including "Red" (e.g., "Black," "Red," "White").

At 230, the system performs a retrieval query for information elements having one or more attribute values within a second range, wherein the second range includes the first range. A retrieval query is when the system actually retrieves the information. The retrieval query returns elements having attribute values in the second range, which is larger than the range used to perform the count. Using the example above, the second range may include prices from $3500 to $6000 or $3000 to $10,000 and a range of colors such as [Green, Black, Red, White, Blue]. Because the count-only query is conducted first, the system is guaranteed to return at least K information elements during the retrieval. One advantage of this approach is that it is typically much faster to perform a count-only query than a retrieval query. Thus, the system need not actually retrieve information until the count-only query verifies that some minimal amount of information will be available.

Figure 3:
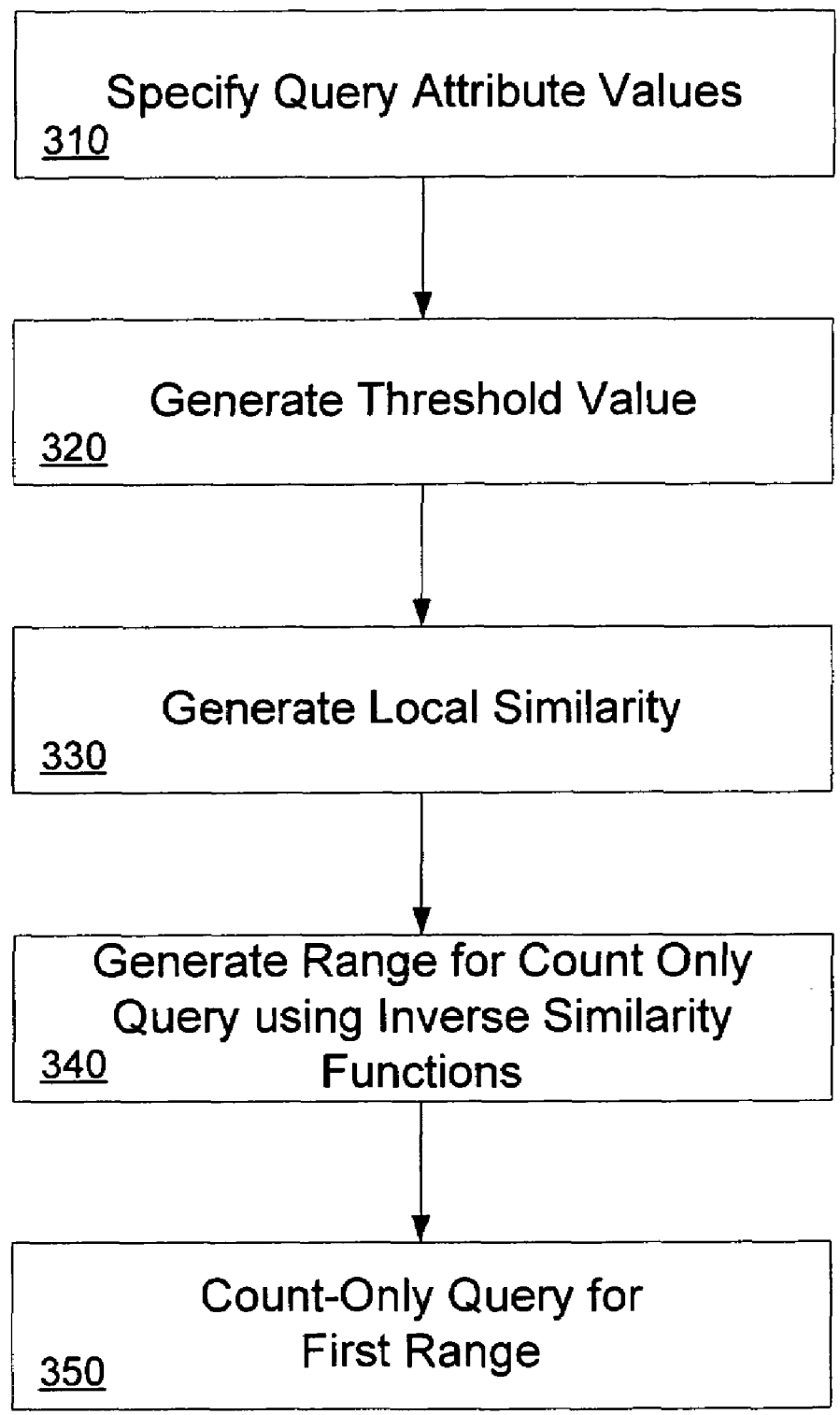
FIG. 3 illustrates generating a range for a count-only query according to another embodiment of the present invention.

In one embodiment, ranges may be based on a threshold value. For example, FIG. 3 illustrates a method according to another embodiment of the present invention. In this example, the query attribute values are specified at 310. At 320, a threshold value is generated. The threshold value may be used to determine which information elements fall within the first range, and which do not. For example, the threshold value may represent a specified value of a function that measures the similarity of the attribute values in a query and each information element. The attribute values of the query and the information element are thus mapped by the function to a value that represents their similarity. If a mapped information element falls below the threshold value, then such element is outside of the range and not counted during the count-only query (i.e., because it is not sufficiently similar to the query). Conversely, if a threshold value is known, an inverse mapping may be used to obtain attribute values for a range query as will now be described.

At 330, local similarity values are generated for each of the attributes in the query using the threshold value. A local similarity value is a measure of the similarity (e.g., closeness or relatedness) of an information element to the query with respect to a particular attribute. For example, the similarity between one attribute of an information element and the corresponding attribute of a query may be given by a predefined relationship between the range of possible values that the attributes may take on and the domain of possible values for the local similarity. The predefined relationships between attribute values and local similarity values are referred to herein as a "local similarity functions."

In one embodiment of the present invention, the threshold value is a function of local similarities, and represents a "global similarity." The threshold value may be thought of conceptually as a plane in an M-dimensional space, where M is equal to the integer number of attributes in the query. Once a threshold value is generated, local similarity values may be generated from the threshold value. After local similarities are generated, attribute ranges for the count-only query may be generated at 340 using the local similarity values and the inverse of the local similarity functions mentioned above (i.e., "inverse local similarity functions"). At 350, the system performs the count-only query for the first range of information elements.

Figure 4:
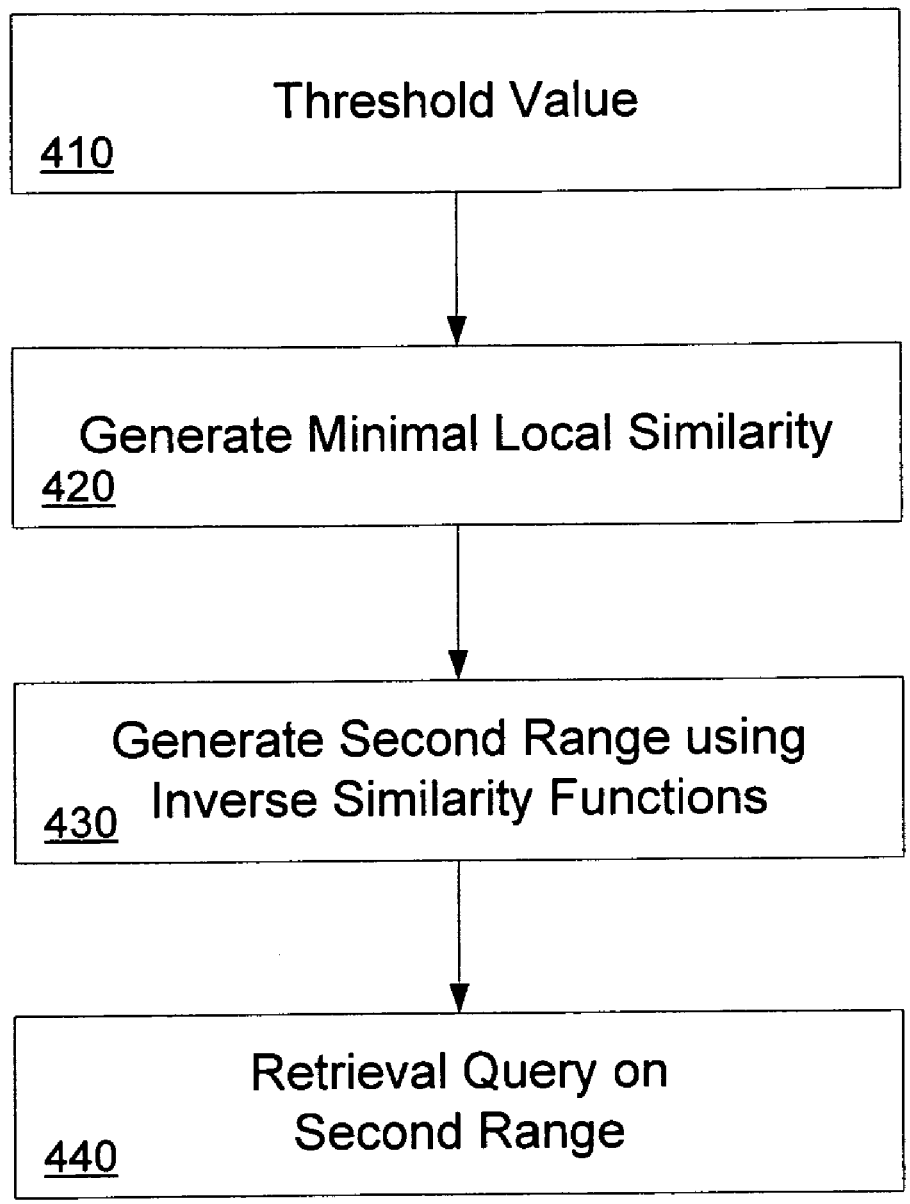
FIG. 4 illustrates generating a range for a retrieval query according to another embodiment of the present invention.

FIG. 4 illustrates generating a range for a retrieval query according to another embodiment of the present invention. Generating a range for a retrieval query starts at 410 with the threshold value. At 420, minimal local similarities are generated. A minimal local similarity is the smallest possible local similarity value an information element may have for a given attribute and yet still have a global similarity greater than or equal to the threshold value. At 430, attribute ranges may be generated from the minimal local similarities using the inverse local similarity functions. At 440, the retrieval query is performed for information elements having one or more attribute values within the resulting range.

Figure 5:
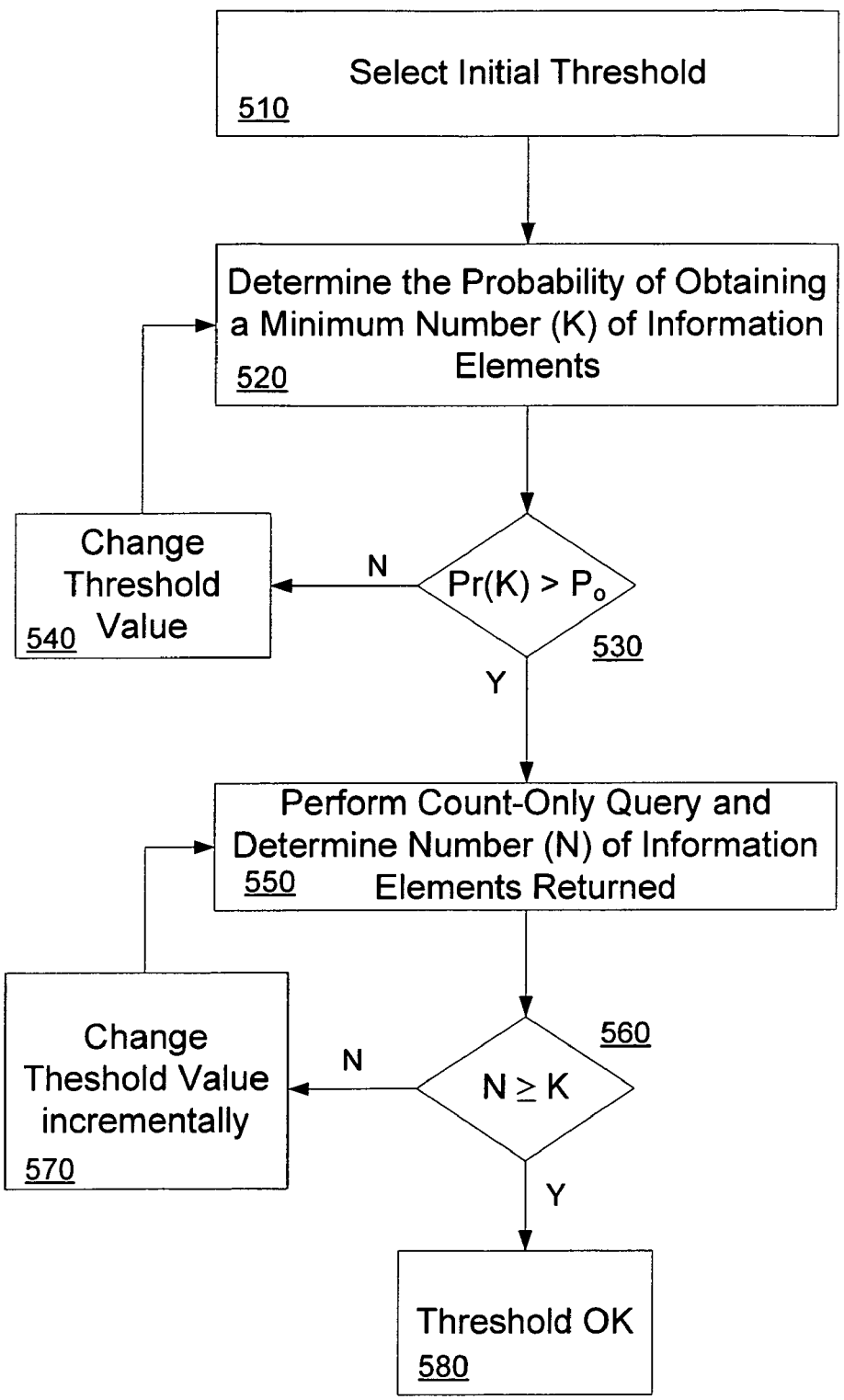
FIG. 5 illustrates generating a threshold value according to another embodiment of the present invention.

FIG. 5 illustrates generating a threshold value according to another embodiment of the present invention. At 510, an initial threshold values is generated. For example, the initial threshold value may be generated using a volume as described in more detail below. At 520, the probability of obtaining a minimum number (K) of information elements is estimated. In one embodiment, it may be assumed that the distribution of represented values of an attribute within a certain range among a given set of information elements is even, such that, for example, if a color range comprises red or green, then it is assumed that there is the same number of red elements as green elements, so the probability estimate could be made directly from the position of the threshold within the range, such that, for example, if the threshold includes red but excludes green, the threshold may be estimated to have the effect that half the elements from the given set are selected. In more practically useful embodiments, more sophisticated probability estimates, based on binomial or other distributions, may be used. At 530, the probability is compared to a threshold probability ($P_o$). If the probability of obtaining a minimum number (K) of information elements is less than the threshold probability (i.e., $Pr(K)<P_o$), then the threshold value is changed at 540 and the probability of obtaining K results is determined using the new threshold value. However, if the probability of obtaining a minimum number (K) of information elements is greater than the threshold probability (i.e., $Pr(K)>P_o$), then the count-only query is performed at 550 and the number of information elements returned, N, is determined. At 560, the number of information elements returned from the count-only query is compared to the desired number of results (i.e., N>K). If N<K, then the threshold value may be changed incrementally at 570, and the count-only query may be repeated at 550. If N>K then the threshold value is satisfactory at 580. However, in some embodiments, if N is much greater than K then the threshold value may be decreased incrementally until N is within some satisfactory range of K. It is to be understood that the exact flow depicted in FIG. 5 is not an essential part of the present invention but merely illustrative of an iterative threshold adjustment that may be used to generate the threshold value used at 410 in FIG. 4.

EXAMPLES

Figure 6:
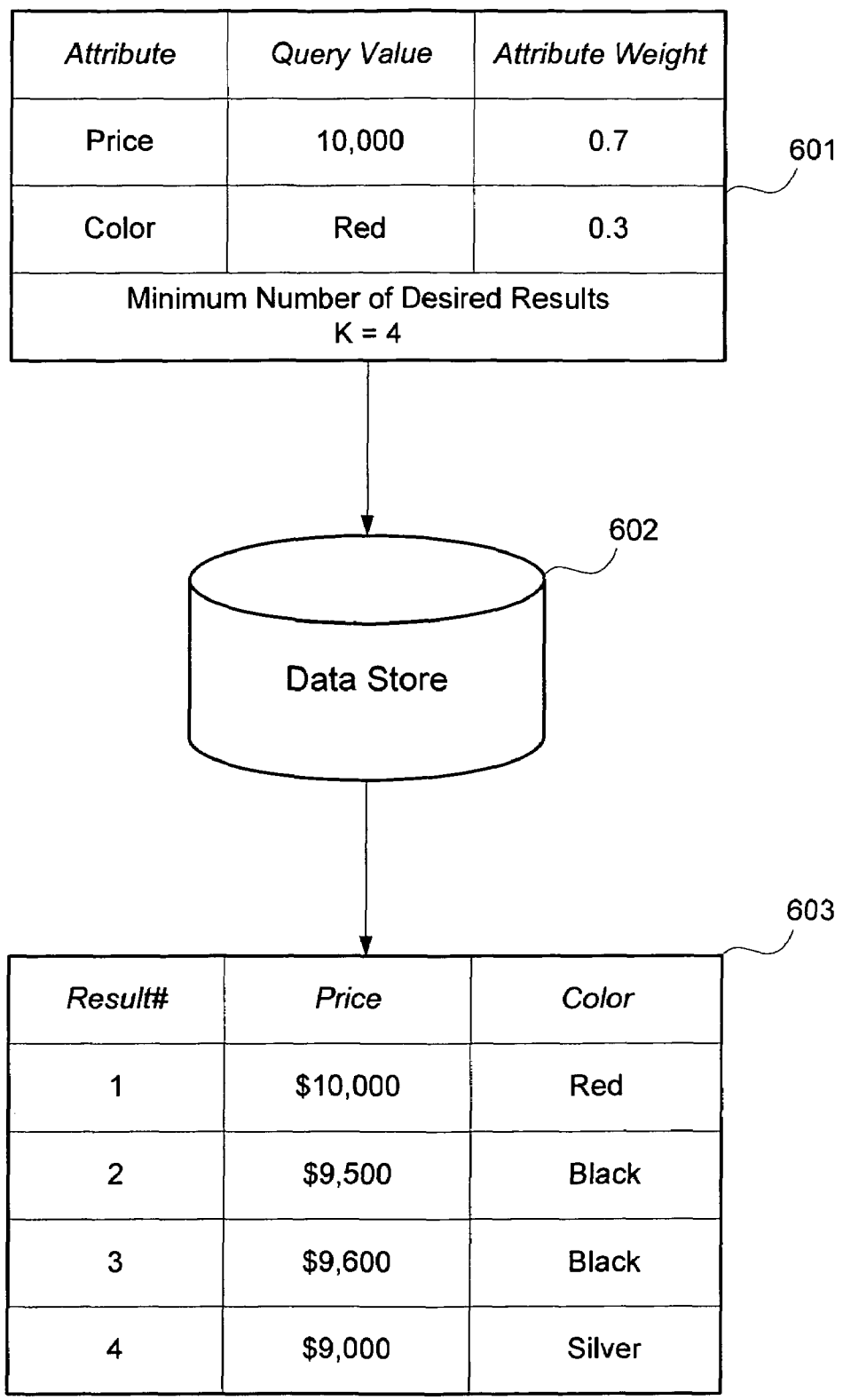
FIG. 6 is an example of a query according to one embodiment of the present invention.

FIG. 6 is an example of information retrieval according to one embodiment of the present invention. In one embodiment, a query 601 may include query values, attribute weights and/or a minimum number (K) of desired results. Attribute weights are numerical values that represent the importance of the corresponding attribute. In this example, the weights are normalized values between zero and one (i.e., [0 . . . 1] such that their sum equals 1). Thus, the weight of 0.7 represents that the "Price" attribute is more important than the "Color" attribute, which has a weight of 0.3 in this example. Of course, it is to be understood that query 601 may be specified in a variety of ways. In one embodiment, a user may type in a phrase such as, "I want a green car for about €5000!" The phrase may be parsed automatically and weights applied in a query Q=[price~5000: 0.4; color~green: 0.6; K=3], wherein the weights and minimum number (K) of desired results may be specified automatically or by a user.

Query 601 is used to search data store 602 for information that satisfies the query parameters. A count-only query is performed first to ensure that at least K results are obtained. Next, a retrieval query is performed to return results 603. In this example there are exactly four (4) results. The first result is an exact match of query 601 (i.e., a red car for $10,000). However, the second result is not an exact match, but it is similar because it returned a black car for $9,500. The third result is also not an exact match, but it is similar because it returned a black car for $9,600. The fourth result returned a silver car for $9,000, which is the most dissimilar to the query parameters of this example.

Figure 7:
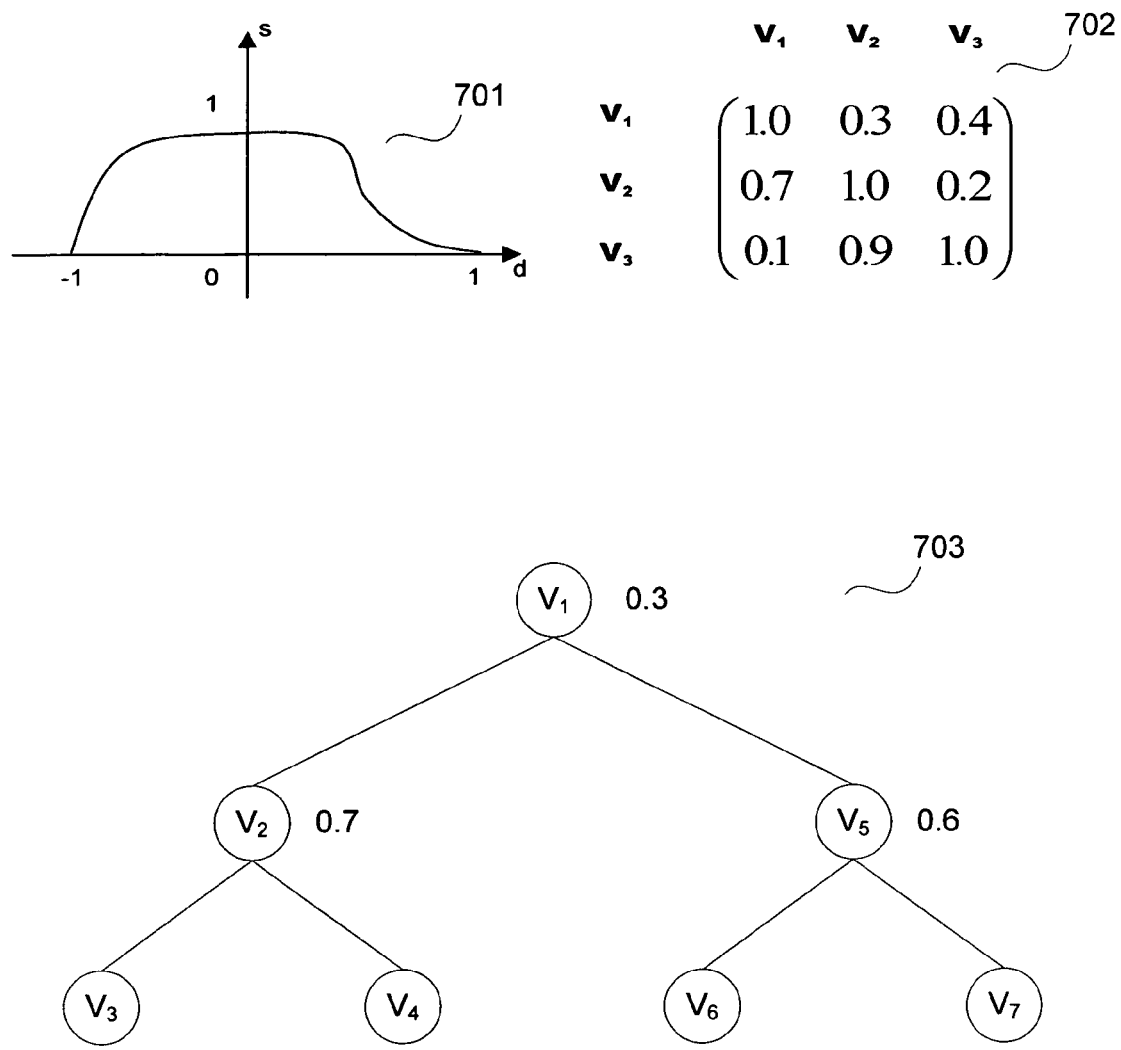
FIG. 7 illustrates representations and notations that may be used in the course of specifying of a similarity model that may be used to determine the similarity between a query and an information element according to one embodiment of the present invention.

FIG. 7 illustrates representations and notations that may be used in the course of specifying of a similarity model that may be used to determine the similarity between a query and an information element according to one embodiment of the present invention. For the remainder of this disclosure, the term "object" will be used to represent the information elements in an information base (e.g., the information base comprises "business objects"). For a given query, the similarity of an object to a query may be computed based on the attributes in the query and the corresponding attributes in the object. For each relevant attribute, a similarity function (i.e., a local similarity function) may be defined. Moreover, the values of the individual similarity functions may be combined to give an overall global similarity. Thus, a mapping from attributes to global similarity includes similarity functions for each attribute and a global similarity function. The local similarity functions and global similarity function are collectively referred to herein as a "similarity model."

A similarity model may include multiple relationships between attributes and local similarity values. FIG. 7 depicts three different representational forms that may be used in specific embodiments, either alone or in combination, to specify a similarity model. Numerical function 701 is a possible similarity function $s=f(d)$, where "s" is the similarity and "d" is the distance between an actual attribute value and the exact value specified in the query. Numerical function 701 may be a polynomial, root, or exponential (e.g., sigmoid), for example. These functions can be applied for float, integer or other numerical attributes. The local similarity for an object may be computed based on the distance between the query value and the object value for the respective attribute. In addition, there are many parameters that may be used to translate a given function or change its shape.

A matrix may be used to model all types of attributes, such as strings, integers or floats. A matrix may be used to ascribe a numerical value for particular attribute values in a query and corresponding attribute values in an object (e.g., the value associated with the intersection of query value V1 with object value V2). Matrix 702 is a possible matrix giving discrete similarity values for given pairings of attribute values. If the query and object values are the same, then their similarity is 1.0 (e.g., leading diagonal), and if they differ, then they need not always differ symmetrically (e.g., $v_{12}$ need not be the same as $v_{21}$). In this example, the columns represent the attribute values instantiated by business objects and the rows represent attribute values specified in the query.

A taxonomy may also be used to model all types of attributes. In particular, taxonomies may be used for attributes that can be ordered in a hierarchical structure, and which may have a wider range of possible values than attributes modeled as matrices. The nodes of the taxonomy contain the minimal similarity value for all children. The local similarity value is generated by finding the common parent node. Taxonomy 703 provides numerical similarity values for pairs of attributes. The nearest node above a given attribute pair (i.e., above $v_i$ and $v_j$) in the tree gives their minimal similarity. For example, the minimal similarity of $v_5$ and $v_6$ is 0.6, and the minimal similarity of $v_3$ and $v_6$ is 0.3.

The following equation is an example of a global similarity function:

$$\sigma = \sum_{i=1}^{M} w_i s_i.$$

In this example, the global similarity, $\sigma$, of an object with respect to a query is defined as the weighted sum of its local similarity values, $s_i$, for all attributes appearing in the query, wherein $w_i$ are the weights for the attributes and M is the number of attributes in the query. In this example, the weights are normalized between 0 and 1 such that $$\sum_{i=1}^{M} w_i = 1.$$

Features and advantages of the present invention include using inverse similarity functions to build query ranges that count candidate objects from an information base. The system can then retrieve at least a minimum number (K) of desired results. As mentioned above, a similarity function may be defined for each relevant attribute of an object. Furthermore, a global similarity of an object with respect to a query may be defined based on the local similarities and weights (e.g., a weighted sum of local similarities). Thus, ranges for a count-only query and retrieval query may be determined from a global similarity threshold value.

Figure 8:
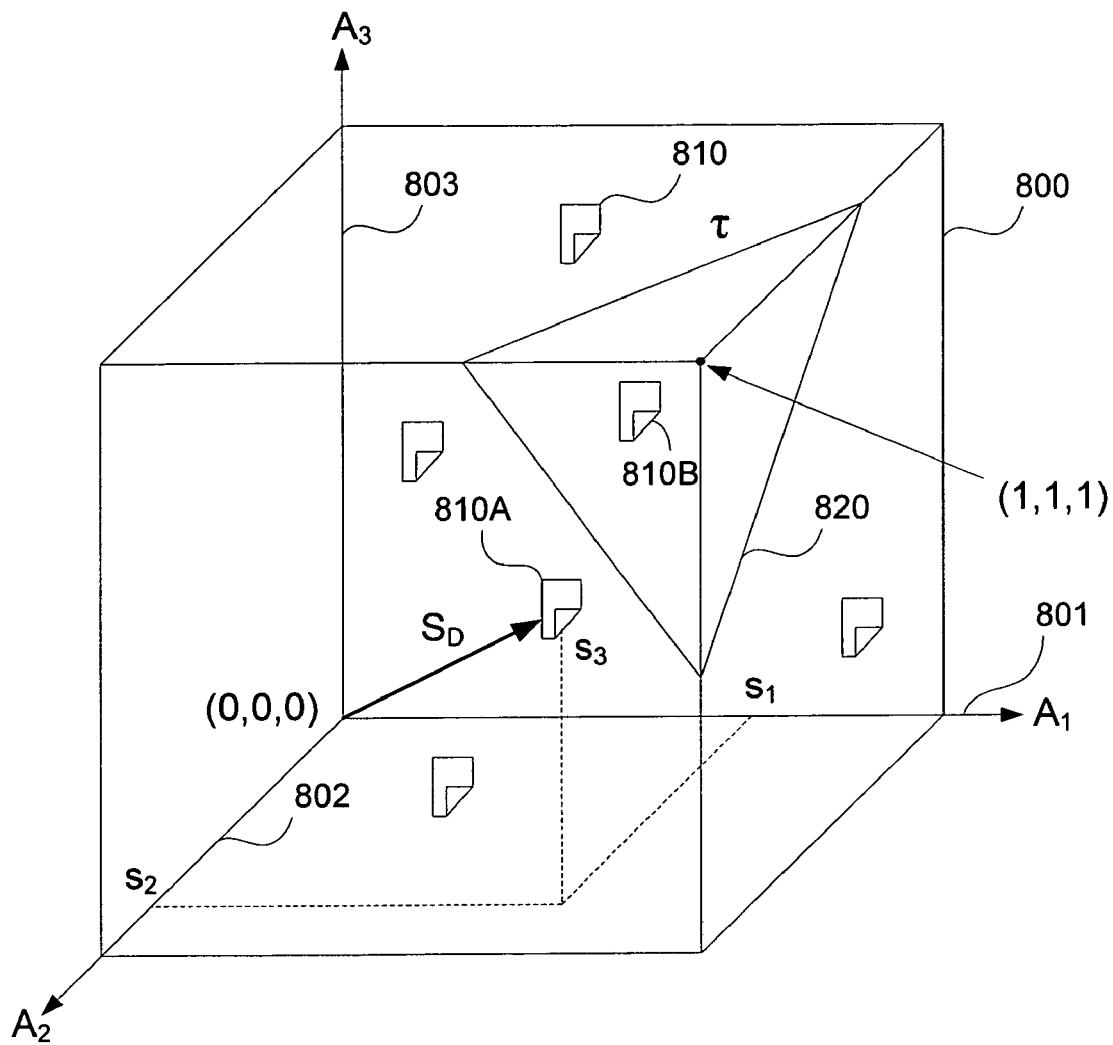
FIG. 8 illustrates a conceptual model that may be used to further understand the concept of a threshold in a global similarity model.

FIG. 8 illustrates a conceptual model that may be used to further understand the concept of a threshold in a global similarity model. FIG. 8 shows that objects in an information base may be represented in an M-dimensional space, where M is the number of attributes. In this example, an M-cube 800 is shown, where M=3 because there are three (3) attributes. The axes of the M-space correspond to the local similarity values for each of the attributes. For example, the first axis 801 corresponds to a range of values of a first local similarity function for a first attribute $A_1$, the second axis 802 corresponds to a range of values of a second local similarity function for a second attribute $A_2$ and the third axis 803 corresponds a range of values of a third local similarity function for a third attribute $A_3$. The local similarity values are all normalized to the range [0 . . . 1]. Objects 810 in the information base may, therefore, be mapped into the M-cube 800. For example, object 810A has a local similarity value of $s_1$ with respect to the first attribute $A_1$, a local similarity value of $s_2$ with respect to the second attribute $A_2$ and a local similarity value of $s_3$ with respect to the third attribute $A_3$. For a given object with attribute values $(v_1, \ldots, v_m)$, there is a corresponding object similarity vector $S_D$. Therefore, each object in an information base has a corresponding point in the complete M-cube.

In this example, the values of the similarity functions are normalized between 0 and 1, where maximally similar is represented by 1 (i.e., equal to; the same as), and maximally dissimilar is represented by 0. Therefore, M-cube 800 is a cube in M-dimensions (in this case M=3) with all the edges of length 1, and its coordinate edges represent the local similarity for the attributes with respect to a given query. The query, and the objects that are an exact match with respect to the query, are represented at the vertex (1,1,1) of M-cube 800, and in general as vertex (1, ... ,1) of the M-cube. The most dissimilar objects are located at the vertex (0,0,0), and in general as vertex (0, ... ,0) of the M-cube.

FIG. 8 shows a plane 820 intersecting M-cube 800. This plane may be referred to as an M-plane. M-plane 820 is a 2-dimensional plane in a 3-cube, and an (M−1)-dimensional hyperplane in a general M-cube, that is defined by a constant global similarity threshold, τ, with respect to a given query. In the 3-dimensional case shown in FIG. 8, the equation for the M-plane is:

$$w_1 s_1 + w_2 s_2 + w_3 s_3 = \tau,$$

wherein $w_1$, $w_2$ and $w_3$ are the weights of the respective attributes $A_1$, $A_2$ and $A_3$, and $s_1$, $s_2$ and $s_3$ are the local similarity values for the respective attributes $A_1$, $A_2$ and $A_3$, and τ is the global similarity threshold value, for example as given by the algorithm presented in FIG. 5. The equation for the general case of M dimensions is analogous.

The intersection of M-plane 820 with M-cube 800 defines an M-pyramid. Thus, in this example the M-pyramid is the pyramid with an apex at (1,1,1) and its base given by the intersection between the complete M-cube 800 and M-plane 820. The M-pyramid is degenerated if and only if at least one of the points that define its base is less than 0 (i.e., if the M-plane intersects more than three sides of the M-cube). Using this conceptualization, it is now apparent that an M-pyramid defined with respect to a given query, Q, and global similarity threshold, τ, contains all objects (e.g., object 810B) that have a global similarity greater than or equal to τ.

Figure 9:
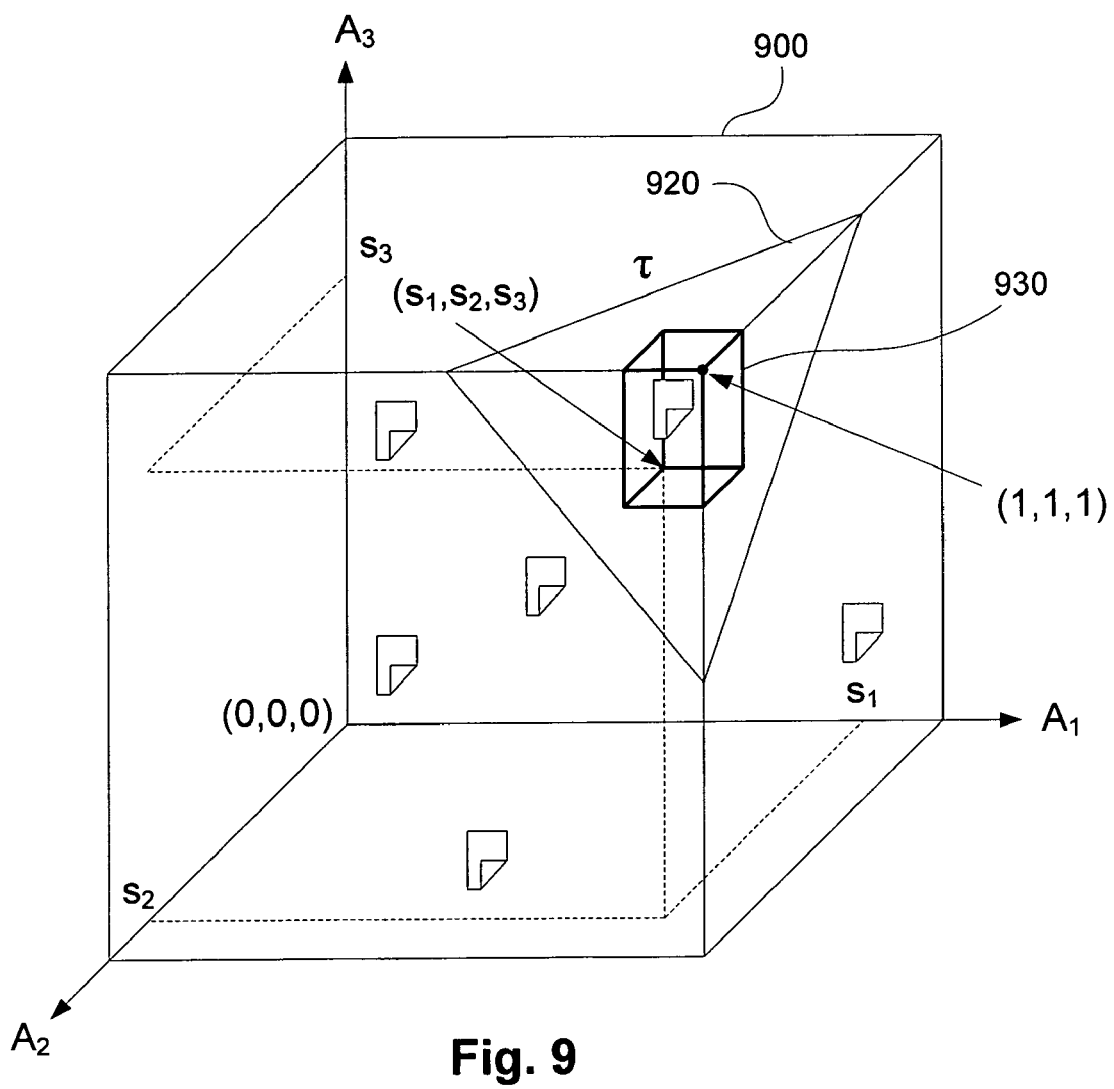
FIG. 9 illustrates count-only query ranges using an M-cube model according to one embodiment of the present invention.

FIG. 9 illustrates count-only query ranges using an M-cube model according to one embodiment of the present invention. A threshold value may be used to define an M-plane 920, which in turn intersects with M-cube 900 to define an M-pyramid. According to one embodiment of the present invention, a count-only query is conducted on the largest possible M-cuboid 930 that fits above M-plane 920. M-cuboid 930 is a cuboid in M-dimensional space, whose edges have lengths between 0 and 1. The coordinates of M-cuboid 930 represent the limits for the local similarity functions for the respective attributes. In other words, if a threshold value is known, local similarity values can be obtained that will define the M-cuboid. For example, M-cuboid 930 is defined by the vertices ($s_1$, $s_2$, $s_3$). Using these similarity values, inverse similarity functions may be used to obtain a range of attribute values for a count-only query. The count-only query will count the objects within M-cuboid 930. The results of this count may be used to further tailor the threshold value so that at least K results are obtained. After at least K results are obtained, then the retrieval query can be performed.

Figure 10:
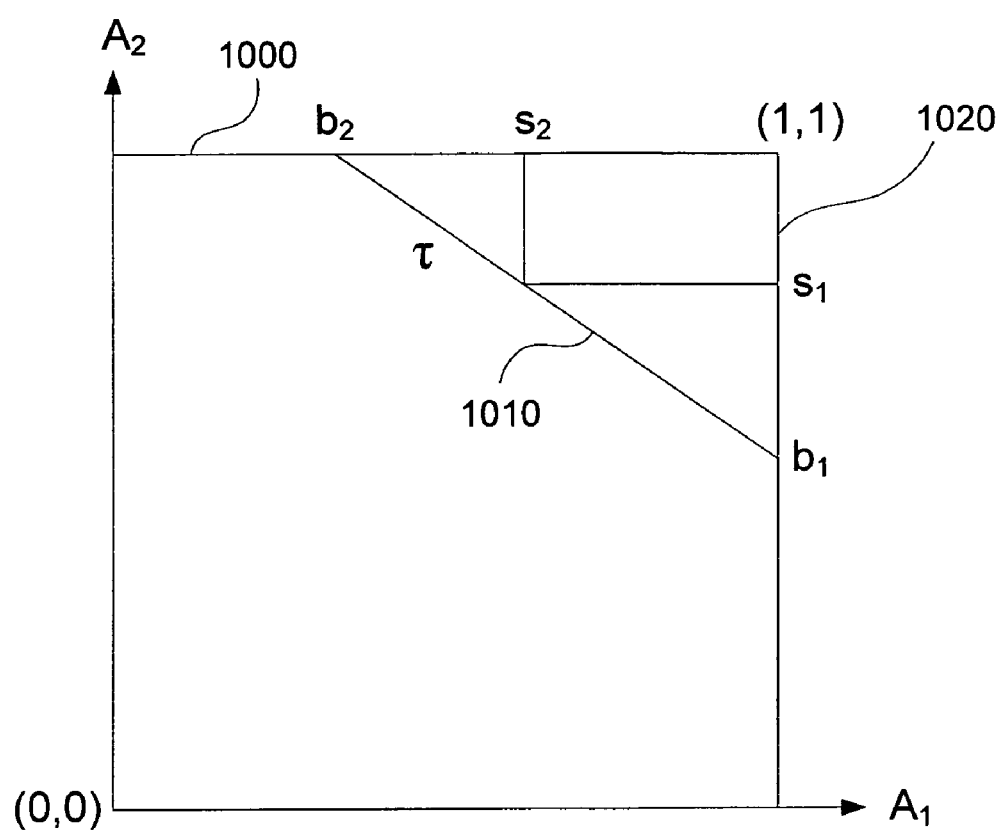
FIG. 10 shows an example of an M-cube for the case M=2.

FIG. 10 shows an example of an M-cube for the case M=2, such that the M-cube 1000 is a unit square with corners (0,0), (0,1), (1,1), (1,0), the M-plane is a line 1010 that intersects the sides of the square at $b_1$ and $b_2$, the M-pyramid is a triangle with corners (1, $b_1$), (1,1), ($b_2$, 1), and the M-cuboid 1020 is a rectangle that has the point (1,1) as its upper right corner. To maximize the volume of the M-cuboid relative to a given M-plane, one of its corners must be exactly on the M-plane. In the example of FIG. 10, the lower left corner of rectangle 1020 is on the line 1010. That is, the coordinates ($s_1$, $s_2$) of the lower left corner of the rectangle satisfy the equation:

$$w_1 s_1 + w_2 s_2 = \tau,$$

wherein τ is the global similarity threshold that defines the M-plane 1010, and with the additional constraints that $b_1 < s_1 < 1$ and $b_2 < s_2 < 1$. The M-cuboid is at a maximum where, $$w_1(1-s_1) = w_2(1-s_2)$$

The generalizations of this result for M dimensions, M>2, and for non-normalized local similarities $s_i$ with maximum values greater than 1, are both analogous.

The M-cuboid with the largest volume may be found by considering the following equations. First, the volume of an M-cuboid is given as:

$$V = \prod_{i=1}^{M} (1 - s_i)$$

To maximize volume, note that the following relation applies:

$$w_1 s_1 + w_2 s_2 + \ldots + w_M s_M = \tau.$$

Therefore, for a given threshold value, τ, the volume is maximized when:

$$w_1(1-s_1) = w_2(1-s_2) = \ldots = w_M(1-s_M).$$

These equations can be used to calculate the values $s_i$. If a calculated value of $s_i$, for some $1 \leq i \leq M$, would be negative, corresponding to a degenerated M-pyramid, $s_i$ can be set to 0 and the corresponding border point $b_i$ can be examined to correct the calculation. The result of the calculation is the M-cuboid with maximal volume for a given threshold value, τ. The resulting M-cuboid is referred to herein as the interior M-cuboid for the given M-plane, since it fits inside the M-pyramid.

Figure 11:
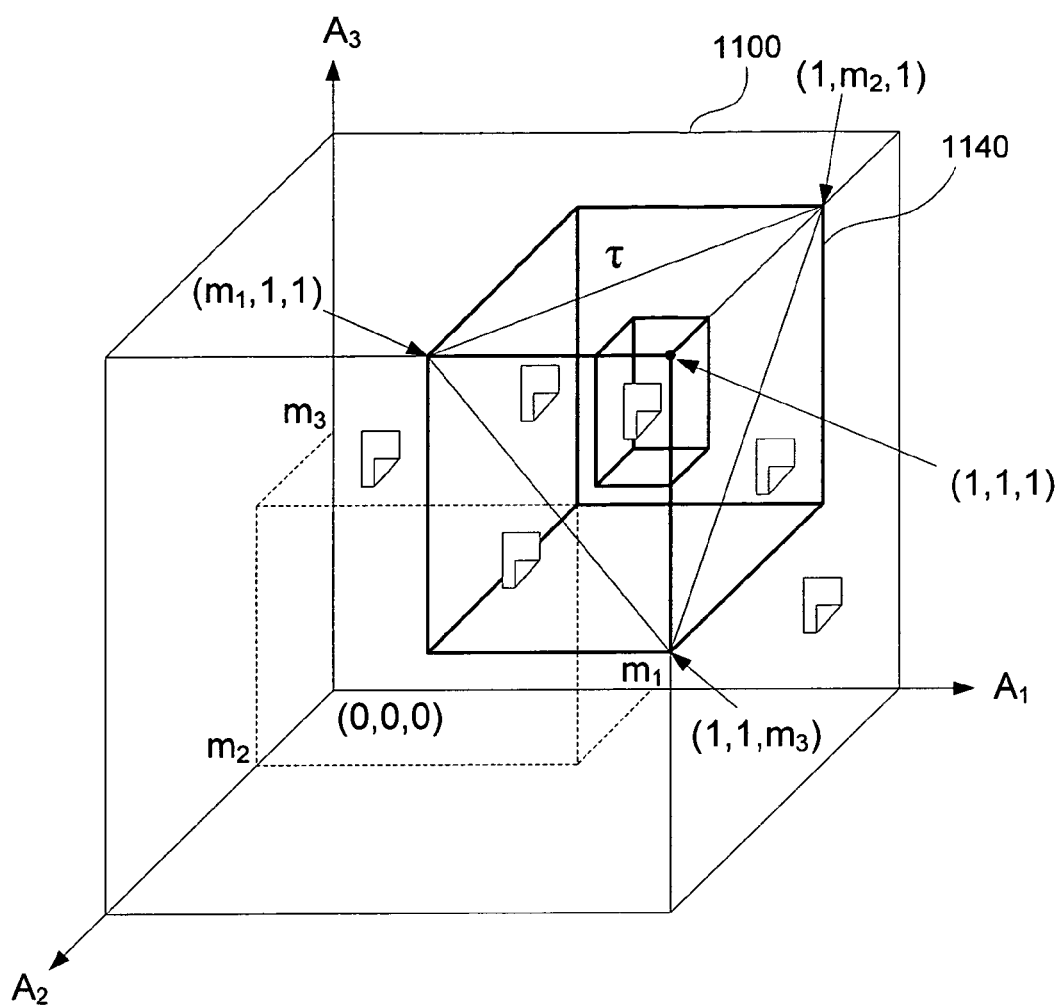
FIG. 11 illustrates retrieval query ranges using an M-cube model according to one embodiment of the present invention.

FIG. 11 illustrates retrieval query ranges using an M-cube model according to one embodiment of the present invention. The retrieval query is obtained from the corners of the M-pyramid. The corners of the M-pyramid are referred to as the minimal local similarities, $m_i$, and include ($m_1$,1,1), (1,$m_2$,1) and (1,1,$m_3$). These points may be used to define an exterior M-cuboid 1140, which contains the M-pyramid and may be used to define the retrieval query. For example, for a particular threshold value, τ, the minimal local similarities for each attribute may be determined by observing the following relation given in the example above:

$$w_1 s_1 + w_2 s_2 + \ldots + w_M s_M = \tau,$$

where M is the number of attributes. At each corner of the M-pyramid (e.g., ($s_1$, $s_2$, $s_3$)=($m_1$,1,1) in M-cube 1100), the global similarity is as follows:

$$w_1 m_1 + w_2(1) + \ldots + w_M(1) = \tau,$$

$$w_1 m_1 = \tau - (w_2 + \ldots + w_M).$$

Since the weights are normalized we have the following:

$$w_1 + w_2 + \ldots + w_M = 1,$$

$$w_2 + \ldots + w_M = 1 - w_1.$$

This equation may be substituted into the equation for $m_1$ as follows:

$$w_1 m_1 = \tau - (1 - w_1),$$

$$m_1 = [\tau - (1 - w_1)]/w_1.$$

More generally, $$m_i = [\tau - (1 - w_i)]/w_i.$$

As mentioned above, an M-pyramid may become degenerated if the M-plane intersects more than three sides of the M-cube. If the M-pyramid is degenerated, then the minimal local similarity value produced by the equation above may be less than zero. Thus, the minimal local similarity should be constrained to be greater than or equal to zero.

Based on the minimal local similarity $m_i$, ranges of values for the corresponding attribute may be determined using an inverse similarity function. For example, similarity functions may take as parameters a normalized distance between an object and a query for a respective attribute and return a similarity value. Conversely, the inverse similarity function may take a similarity value and return a normalized distance. Thus, normalized distances can be obtained using minimal local similarities. The normalized distances, in turn, can be denormalized to obtain values that have a similarity greater than minimal local similarity $m_i$. The corresponding range may be conceptualized by cuboid 1140 of FIG. 11. Thus, given a query value and the normalized distance, the minimum and maximum values can be determined. The minimum and maximum values may also depend on additional parameters that modify or scale the normalized distance.

Example similarity functions include numerical functions, matrices or taxonomies. Numerical functions may be described using equations capable of covering continuous ranges of values. Such functions may be described with or without the assistance of graphs (e.g., 701 of FIG. 7). Matrices or taxonomies may be used to represent discrete sets of values. Example numerical functions include polynomials, exponentials and roots. Each of these receives two main variables as parameters. One of the parameters is the distance, $d=d(v_Q, v_O)$ between the query value $v_Q$ and the object value $v_O$ for a particular attribute. The second parameter is a slope parameter, $\rho$, which affects the curvature of the function. The slope, $\rho$, may also be a normalized value between 0 and 1. The three numerical functions may be written as follows:

$$\text{Polynomial } f_A(d) = (1-d)^{\frac{1}{\rho}} \quad (1)$$

$$\text{Root: } f_A(d) = (1-d)^{\rho} \quad (2)$$

$$\text{Exponential } f_A(d) = \begin{cases} 1 - \frac{(2d)^{\frac{1}{\rho}}}{2}, & d < \frac{1}{2} \\ \frac{(2-2d)^{\frac{1}{\rho}}}{2}, & d \geq \frac{1}{2} \end{cases} \quad (3)$$

wherein a slope of $\rho=1$ collapses the three cases into a single linear function $f_A(d)=1-d$. The local similarity functions may be symmetric or asymmetric. If the function is symmetric, the similarity between a query value and an object value is equal to the similarity between the object value and the query value. If the function is asymmetric, the similarity between a query value and an object value can be different from the similarity between the object value and the query value. As mentioned above, the global similarity is a function of the individual local similarities. There are many possible ways in which the local similarity functions may be combined to give a meaningful global similarity such as minimum, maximum or linear combinations (e.g., weighted sums as in the examples above).

The inverse similarity functions may be obtained for each of the example numerical functions above. The range of values is defined by a minimal and maximal value because these functions are strictly decreasing. To compute the minimum and maximum of the interval, the normalized distance must first be determined. The distance for the three numerical functions is computed as follows:

$$\text{Polynomial } d_i = 1 - m_i^{\rho} \quad (1)$$

$$\text{Root: } d_i = 1 - m_i^{\frac{1}{\rho}} \quad (2)$$

$$\text{Exponential } d_i = \begin{cases} 1 - \frac{(2m_i)^{\rho}}{2}, & x \geq \frac{1}{2} \\ \frac{(2-2m_i)^{\rho}}{2}, & x < \frac{1}{2} \end{cases} \quad (3)$$

where $d_1$ is the normalized distance and $m_i$ the minimal local similarity for the $i^{th}$ attribute $A_i$, $1<i<M$. In this example, numerical similarity values are defined for values that are both greater than and less than the query value. Additionally, in this case the functions are symmetric (i.e., $d(v_Q, v_{Omin})=d(v_Q, v_{Omax})$). In other words, an object value $v_O$ a distance d above the query value $v_Q$ will result in the same similarity value as an object value $v_O$ a distance d below the query value $v_Q$ (e.g., object values of 8,000 and 12,000 will both produce the same similarity value for a query value of 10,000). Thus, the range can be determined by adding and subtracting the denormalized distance from the query value. In other words, if the denormalized distance, d, between an object value $v_O$ and a query value $v_Q$ is known, we can calculate the minimum and maximum range as follows:

$$v_{Omin}=v_Q-d,$$

$$v_{Omax}=v_Q+d.$$

Inverse similarity functions for other types of functions may also be used to obtain ranges. For example, the inverse function for a matrix may return a list of object values that have a local similarity greater than the minimal local similarity. To obtain a range of values for a matrix, the entries in the matrix for a given attribute may be examined iteratively, and if a matrix entry corresponding to $(v_Q, v_O)$ is greater than the minimal local similarity, then $v_O$ is included in the range. Inverse functions for a taxonomy are similar to inverse functions for a matrix in the sense that such functions may also return a list of object values for a respective attribute, A, that has a local similarity with respect to the query that is greater than the minimal local similarity. Such objects may be obtained by traversing the taxonomy, starting at the query node, for example, and working toward the root until a node is encountered with a numerical local similarity value that is below the required minimal local similarity. The range may include all child nodes reachable from the current node.

Embodiments of the present invention include techniques for determining threshold values. For example, in one embodiment the present invention includes estimating a global similarity threshold, $\tau$, for which at least K results are obtained. The following is an example. First, a volume of the M-pyramid is calculated based on the assumption that the objects are homogeneously distributed in the M-cube. Since the volume of an M-cube is equal to 1, a relevant volume, v, of the M-pyramid may be determined according to the following:

$$v = \frac{K}{N};$$

where K is the number of desired results and N is the total number of objects in the information base. Next, global similarity threshold, τ, may be calculated using the following volume formula:

$$v = \frac{(1-\tau)^M}{M! \prod_{i=1}^{M} w_i}.$$

For a degenerated M-pyramid, the volume may be obtained using triangulation methods of polytope volume computation. For a given volume, $V_\sigma$ an approximation search for the threshold value may be performed because $V_\sigma$ is a strictly decreasing function of σ.

The initial threshold value may be verified by calculating the probability of obtaining K results. For example, the probability, p, of finding a randomly selected object above the M-plane is, $$p = v/1,$$

wherein v is the volume of the corresponding M-pyramid and 1 represents the volume of the complete M-cube. Using a binomial distribution with a probability of success, p, the probability of having at least K results above a given threshold is, $$Pr(K) = \binom{K}{N} p^K (1-p)^{N-K};$$

or equivalently, given that p=v, $$Pr(K) = \binom{K}{N} v^K (1-v)^{N-K};$$

$$Pr(K) = 1 - \sum_{i=0}^{K-1} \binom{i}{N} v^i (1-v)^{N-i};$$

wherein the last equation illustrates that the probability of at least K results may be calculated by subtracting the cumulative probabilities of less than K results. To find a threshold value, an approximation search for an M-pyramid may be conducted. When an M-pyramid having a volume, v, that results in a sufficiently high probability (i.e., greater than some threshold probability) of returning at least K results is found, the corresponding threshold value may be used as the starting value for generating the local similarity values for the count-only query.

According to one embodiment of the present invention, the count-only query is performed after a starting value for the threshold is generated. However, if the count-only query returns k results, wherein k<K, then the initial threshold value should be changed. According to one possible approach, the volume, v, of the M-pyramid is increased by the following amount:

$$dv = v \cdot \frac{dK}{k};$$

where dv is the change in volume of the M-pyramid, v is the volume of the current M-pyramid and dK=K−k.

FIG. 12 is example pseudo code for retrieving information according to one specific embodiment of the present invention. The input of algorithm 1200 is a query containing pairs consisting of an attribute and a value assigned to that attribute (e.g., the pair "Price" and "$10,000"), the number of desired results K, and a set of weights to be attached to the respective attributes. In this example, the output is a ranked list of documents with their global similarity value σ ordered decreasingly by σ. First, the threshold value τ is initialized. Heuristic approaches may be used for initialization, for example, or the initialization techniques discussed above may be used. Next, the algorithm computes minimal local similarities, finds the biggest possible M-cuboid above the M-plane and constructs a count-only orthogonal query based on the current value of τ. If the number of results k is greater than or equal to the desired number of results, then a loop control variable "done" is set equal to "true" and the current value of τ is used. However, if the number of results k is less than the desired number of results, then the value of τ is lowered and the calculations are repeated. When at least K desired results are obtained, then a retrieval query is constructed across a range corresponding to minimal local similarities ($m_1, \ldots, m_M$). Finally, a priority queue is used during the calculation of the global similarity of each document so that the final result is a ranked list of K documents ordered decreasingly by σ.

The following is a specific numerical example to illustrate some of the concepts discussed above. In this example the following query will be used with the desired number of results K=5:

| Attribute | Query Value | Attribute Weight |
|---|---|---|
| Price | 10000 | 0.7 |
| Color | Red | 0.3 |

In this example, the information base is an index database. An index database organizes attributes of each object in a table with several columns representing the respective attributes for the particular index object. For example, an object in an index database may include attributes of a document such as creation date, author, model information, price information and a pointer to the contents of the document. Thus, the index supports string, integer, float, date and price attribute types. For the present example an index with N=100 objects (e.g., cars) will be used. First the initial threshold value is calculated by assuming that the objects in the index are approximately homogeneously distributed. The entire space has a volume of 1, which corresponds to 100 cars. Since the desired number of results K =5, then our volume is given by:

$$v = \frac{K}{N} = \frac{5}{100} = 0.05.$$

Using this volume, the initial threshold value may be calculated as follows:

$$\tau = 1 - \sqrt[M]{v \cdot M! \prod_{i=1}^{M} w_i} = 1 - \sqrt[2]{(0.05) \cdot (2!) \cdot (0.7) \cdot (0.3)} = 0.855.$$

For this threshold value, the probability of obtaining at least K=5 results can be calculated as follows:

$$Pr(K) = 1 - \sum_{i=0}^{K-1} \binom{i}{N} v^i (1-v)^{N-i} = 0.97;$$

where N=100, K=5 and v=0.05.

In this example, similarity values are obtained from the largest possible M-cuboid that fits above the M-plane defined by the global similarity threshold value τ=0.855. Using the M-equalities provided above for the largest possible M-cuboid the similarity values are given by:

$$s_1 = 1 - \frac{1-(0.855)}{2 \cdot (0.7)} = 0.896;$$

$$s_2 = 1 - \frac{1-(0.855)}{2 \cdot (0.3)} = 0.758.$$

The count-only query is constructed for the M-cuboid (<$s_1$, $s_2$>,<1,1>). Using inverse functions, the price interval may be [8,000, 12,000], for example, and the color interval [red]. Of course, the intervals depend on the particular inverse functions used. Thus, the count-only query is performed as follows:

price IN [8,000, 12,000] AND color IN [red]

If the query returns less than K=5 results, then the threshold value τmay be changed.

Next, minimal local similarities for the threshold value τ=0.855 are calculated. In this example, the minimal local similarities are calculated using the following formula:

$m_i=[\tau-(1-w_i)]/w_i$.

$m_1=[\tau-(1-w_1)]/w_1=[0.855-(1-0.7)]/0.7=0.792$ $m_2=[\tau-(1-w_2)]/w_2=[0.855-(1-0.3)]/0.3=0.516$ Using these minimal local similarities, the corresponding ranges may be calculated using inverse similarity functions, which may produce an interval of [5000, 15000] for price and [red, orange] for color. Thus, the retrieval query is performed as follows:

price IN [5,000, 15,000] AND color IN [red, orange], which may produce 20 results, for example. The results may be rated individually while keeping the best 5 in a priority queue as follows:

| Document ID | Global Similarity | Price | Color |
|---|---|---|---|
| 10 | 0.99 | 11,000 | Red |
| 54 | 0.90 | 8,000 | Red |
| 12 | 0.87 | 9,500 | Orange |
| 77 | 0.86 | 8,500 | Orange |
| 3 | 0.80 | 14,000 | Red |

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, information retrieval methods according to the present invention may include some or all of the innovative features described above. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of retrieving information comprising:

receiving a first query from a user, the first query including a plurality of specified attribute values corresponding to a plurality of attributes, wherein the first query includes at least a first attribute having a corresponding first attribute value and a second attribute having a corresponding second attribute value;

in response to the first query, automatically performing, on the computer, steps as follows:

automatically generating a first range from the plurality of specified attribute values, the first range comprising a first plurality of attribute values for the first attribute, the first plurality of attribute values defining a first attribute range that includes the first attribute value; and a second plurality of attribute values for the second attribute, the second plurality of attribute values defining a second attribute range that includes the second attribute value;

performing a count-only query on a structured information base for information elements having attribute values within the first range, wherein the count-only query returns a first value representing a number of information elements in the structured information base having (i) said first attribute, (ii) an attribute value of said first attribute within the first attribute range, (iii) said second attribute, and (iv) an attribute value of said second attribute within the second attribute range; and if the first value is less than a specified minimum number of desired results, increasing the first range and repeating said count-only query, and if the first value is greater than or equal to the specified minimum number of desired results, automatically generating a second range from the plurality of specified attribute values, the second range comprising a third plurality of attribute values for the first attribute, the third plurality of attribute values defining a third attribute range that is greater than or equal to the first attribute range, and a fourth plurality of attribute values for the second attribute, the fourth plurality of attribute values defining a fourth attribute range that is greater than or equal to the second attribute range; and performing a retrieval query for information elements having attribute values within the second range, wherein the retrieval query returns information elements in the structured information base having (i) said first attribute, (ii) an attribute value of said first attribute within the third plurality of attribute values, (iii) said second attribute, and (iv) an attribute value of said second attribute within the fourth plurality of attribute values; and in response to the first query, automatically returning said information elements having attribute values within the second range to the user.

2. The method of claim 1 wherein the first value is an integer number equal to the number of information elements having a global similarity to the first and second attribute values greater than a threshold value.

3. The method of claim 2 wherein the threshold value is equal to a sum of weighted local similarity values.

4. The method of claim 2 wherein the first range is generated using one or more local similarities.

5. The method of claim 4 wherein the first range is generated using inverse similarity functions.

6. The method of claim 1 wherein the second range is generated using one or more minimal local similarities.

7. The method of claim 6 wherein the second range is generated using inverse similarity functions.

8. The method of claim 2 wherein an initial threshold value is based on a probability of obtaining a minimum number (K) of information elements.

9. The method of claim 8 wherein the initial threshold value is changed if the count-only query returns a value that is less than the minimum number (K).

10. The method of claim 1 wherein the first query comprises the specified minimum number of desired results.

11. The method of claim 1 wherein the first query includes one or more weights corresponding to the one or more attributes.

12. The method of claim 1 further comprising defining a similarity model.

13. The method of claim 12 wherein the similarity model comprises one or more local similarity functions or inverse similarity functions corresponding to the one or more attributes in the first query.

14. The method of claim 13 wherein the one or more local or inverse similarity functions include a numeric function, a matrix, or a taxonomy.

15. The method of claim 1 wherein the information elements are electronic documents, objects, rows of a database table, or an XML file.

16. The method of claim 1 wherein the first query includes M attribute values corresponding to M attributes and the first and second ranges are M-dimensional.

17. A computer-implemented method of retrieving information comprising:

receiving, from a user, a first query including a plurality of specified attribute values corresponding to a plurality of attributes;

upon execution of the first query, automatically performing, on a computer, the following steps:

generating a threshold value;

generating a local similarity value for each of the plurality of attributes based on the threshold value;

generating a first range based on each local similarity value, the first range including the specified attribute values;

performing a count-only query on a structured information base for information elements having one or more attribute values within the first range, wherein the count-only query returns a first value representing a number of information elements having attribute values within the first range;

if the first value is less than a specified minimum number of desired results, increasing the first range and repeating said count-only query, and if the first value is greater than or equal to the specified minimum number of desired results, then performing a retrieval query for information elements having one or more attribute values within a second range, wherein the second range is greater than or equal to the first range; and wherein performing the retrieval query comprises:

automatically generating the second range from the plurality of specified attribute values, the second range including a first plurality of attribute values for a first attribute, the first plurality of attribute values defining a first attribute range, and a second plurality of attribute values for a second attribute, the second plurality of attribute values defining a second attribute range, wherein the retrieval query returns information elements in the structured information base having (i) said first attribute, (ii) an attribute value of said first attribute within the first plurality of attribute values, (iii) said second attribute, and (iv) an attribute value of said second attribute within the second plurality of attribute values; and returning the information elements having one or more attribute values within the second range to the user.

18. The method of claim 17 wherein the threshold value is based on a global similarity threshold.

19. The method of claim 18 wherein the global similarity threshold is equal to a sum of weighted local similarity values.

20. The method of claim 17 wherein the first range is generated using inverse similarity functions.

21. The method of claim 17 wherein the second range is generated using the threshold and a plurality of minimal local similarities.

22. The method of claim 21 wherein generating the second range includes calculating the minimal local similarities based on the threshold and calculating a plurality of attribute values to define endpoints of the second range using the minimal local similarities and inverse similarity functions.

23. The method of claim 17 wherein the first query comprises the specified minimum number of desired results, and wherein the threshold is changed if the count-only query returns fewer than said minimum number of information elements.

24. The method of claim 17 wherein the first query includes one or more weights corresponding to the one or more attributes.

25. The method of claim 17 wherein the first query includes M attribute values corresponding to M attributes and the first and second ranges are M-dimensional.

* * * * *